Nov. 24, 1931.  J. WAHL  1,833,009
VULCANIZING APPARATUS
Filed March 30, 1927
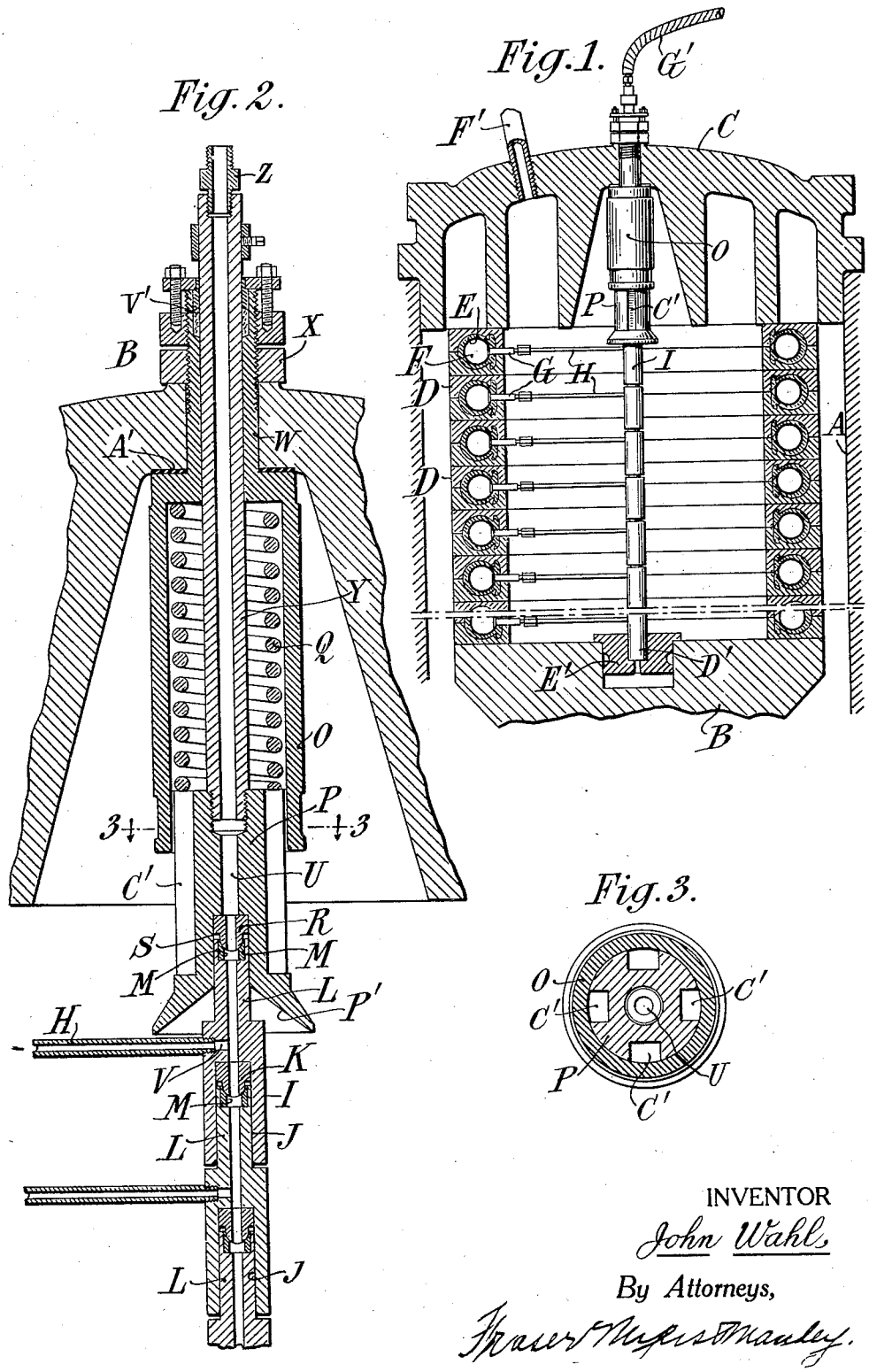
INVENTOR
John Wahl,
By Attorneys,
Fraser Myers Manley.

Patented Nov. 24, 1931

1,833,009

UNITED STATES PATENT OFFICE

JOHN WAHL, OF ROSEDALE, NEW YORK, ASSIGNOR TO A. SCHRADER'S SON, INCORPORATED, OF BROOKLYN, NEW YORK, A CORPORATION OF NEW YORK

VULCANIZING APPARATUS

Application filed March 30, 1927. Serial No. 179,581.

This invention relates to vulcanizing apparatus, and aims to provide certain improvements therein.

In the vulcanization of pneumatic tire shoes, it has heretofore been proposed to provide a vulcanizing chamber in the form of a vertical cylinder through the bottom of which is operated a hydraulic ram constituting the support for the tire moulds, which are stacked in series upon the ram until the capacity of the cylinder is reached, whereupon a cover is applied to the latter and steam is introduced into the cylinder to provide the necessary vulcanizing heat. Each of the tire moulds is formed in two cylindrical sections and within each mould and inside of the tire is placed what is known as an air bag, usually of rubber composition, which is provided with a valve extending out of the mould sections in a radially inward direction, which valve is coupled with a source of air under pressure and inflated to press the unvulcanized shoe against the interior of the mould. In such constructions the mould sections are held together by the force of the ram operating against the entire series of stacked moulds, compressing the same under considerable pressure against the cover of the cylinder. Air under pressure is led to the various air bags through a series of what have come to be known as manifold couplings, which in brief are a series of coupling sections, one for each mould, each coupling section interfitting with adjacent sections and the stack being connected at the top or bottom with a supply of air under pressure. Each coupling section has a flexible tube leading from it which is adapted to be connected with the valve of the air bag. In loading the vulcanizer the ram is elevated to near the top of the cylinder, the moulds are introduced through such top one at a time, and as they are introduced a manifold coupling is supplied for each mould and its flexible tube is connected to the air bag valve of each air bag. As the ram is slowly lowered the stack of moulds is built up and also the corresponding series of manifold couplings, this being continued until the last mould is inserted, whereupon the cover is placed upon the cylinder and clamped. The air connection having been made with the series of manifold couplings, the ram is then put under pressure, air introduced into the air bags, and steam into the interior of the cylinder. It is, of course, necessary that the series of manifold couplings should be connected with each other with an air-tight joint capable of standing severe pressures, and it has heretofore been proposed to construct such couplings without individual means of making such connections, the tight joints being formed by pressing the entire series of couplings endwise between the cover and the ram with substantially the same pressure as that which the ram imposes upon the series of moulds. Such devices have been successfully operated and it is to this type of device that the present invention chiefly relates.

It will be observed that the series of manifold couplings cannot be made with sufficient precision so that when the ram presses the stack of moulds against the cover with the requisite pressure, the series of manifold couplings are also put under a similar pressure. It has been proposed, therefore, to introduce a spring member into the system of manifold couplings so that inequalities in the individual lengths of these members will be taken up and the resultant pressure exerted by the ram against the series modified by the spring. My invention provides a construction of spring take up for the manifold couplings which is efficient and durable; which permits a proper pressure to be placed upon the series under varying conditions of mould thickness so as to secure a leak-tight condition of the entire series without danger of breakage. The invention also includes other features of improvement which will be hereinafter more fully described.

Referring to the drawings which illustrate one form of the invention,—

Figure 1 is a vertical section of a sufficient portion of the vulcanizer to illustrate the present invention, the manifold couplings being shown in elevation.

Fig. 2 is an enlarged detailed view of several of the couplings and the spring device provided by my present invention.

Fig. 3 is a section on the line 3—3 in Fig. 2.

Referring to the drawings, let A indicate the wall of the vulcanizing chamber and B the upper section or platform of a hydraulic ram forming a movable bottom for the chamber, and being capable of travel from a point near the top of the chamber to the bottom thereof. C is a cover which is clamped upon the chamber during the vulcanizing operation and removed therefrom to load and unload the vulcanizer. D D are a series of moulds, each comprising two one-half sections and being flat on its upper and lower sides, so that they stack properly in the vulcanizer, the ram when under pressure clamping the series against the cover. E is a tire shoe within the mould being pressed out against the internal configuration thereof by an air bag F, the latter having a valve G which is coupled to a flexible tube H connected with a manifold coupling section I through which air is introduced into the air bag. There are usually as many coupling sections I as there are moulds, and these are of a form to stack together, as for instance that which is shown. By referring to Fig. 2, each of the couplings illustrated is seen to comprise a cylindrical member having a long internal socket J, terminating in a seat member K and also having at its opposite end a long nipple L adapted to enter the socket J and having a complemental seat portion M. A stack of such couplings by reason of the long sockets and nipples has a very considerable lateral rigidity, and is well adapted to withstand the severe lengthwise pressure which is incident to the system of tightening the entire series into leak-tight relation by endwise pressure on the stack.

The general features as thus far described are not a part of the present invention.

According to the present invention I provide a means for taking up inequalities in the stack of manifold couplings and of holding the same under compression, which means are preferably located in the cover C and comprise a spring device adapted to make contact with the end coupling thereby putting a compression upon the whole series. In the drawings I have shown a cylinder O within which is mounted a plunger P urged in the direction of the stack of couplings by a spring Q which is shown as pressing against the upper end of the cylinder and the top of the plunger. The plunger P has a coupling seat R arranged within a socket S which is designed to receive one of the nipples L of a coupling I, the nipple being, as before stated, provided with a complemental coupling member M arranged within a recess in the nipple. The complemental coupling seats R and M are spherical in shape, thereby permitting some tilting of the coupling I and the plunger P and assuring a tight joint under all working conditions.

The plunger P is provided with an air passage U extending through it, which passage also extends through the coupling seats and through the couplings and is connected with lateral passages V leading to the flexible tubes H, through which air is fed to the air bags. The cylinder O is shown as held in place in the cover by means of a tubular extension W passing through an aperture in the cover and held down by a nut X which engages the outside of the extension. The plunger is shown as provided with a pipe Y passing through the cylinder and extension and adapted for connection with a source of air supply by a nipple, such as Z. Means are provided for preventing leakage between the cylinder and the cover, such as a packing A', and also between the pipe Y and the tubular extension W, a stuffing box V' being shown for this purpose.

I prefer to avoid any piston effect on the part of the plunger P, so that the steam pressure within the vulcanizer shall not tend to loosen the connections between the various manifold couplings. This may be done in any way which will allow steam to reach the upper end of the plunger, as for instance, by passages C' C', best shown in Fig. 3.

The seat members of each of the manifold couplings are preferably curved or spherical in form, so that the seats of the entire stack are made self-adjusting. At the bottom of the stack I provide a foot member D' which is adapted to receive the lowest of the couplings of the stack, which member is provided at its top with a nipple similar to the nipples L of the couplings, but being imperforate, thus serving as a closure for the lower end of the stack. Such foot member D' may rest within a foot piece E' held in a recess in the upper part of the ram. I also prefer to form a guiding face P' on the lower end of the plunger, this being shown as a flaring mouth having a tapered interior which is adapted to engage the nipple of the upper coupling and guide it to its seat when the cover is placed over the vulcanizer.

In operation the ram is moved to its uppermost position, the first mould containing a tire to be cured is arranged on the upper face of the ram, one of the manifold couplings I is then slipped into the foot piece D', and its flexible tube connected with the air bag valve. While the ram is slowly descending, the series of moulds and couplings are built up and when the total number of moulds constituting the capacity of the vulcanizer is reached, the cover is lowered into position, the upper manifold coupling entering the plunger as the cover descends. The cover is then fastened in position and the ram moved upwardly, thus clamping the stack of moulds and the stack of couplings, the plunger P yielding against its spring. Steam is then introduced into the vulcanizer through a steam connection F' and air through an air connection G' leading to the nipple Z. The steam and air supply are either maintained during the vulcanizing operation or varied according to the methods of the individual user. The strength of the spring is dependent upon the other factors, such as air pressure, steam pressure, etc., but I have found that a spring which at a compression of three and one-half inches is under tension of about 1300 pounds answers the requirements in most instances.

While I have shown and described one form of the invention, it will be understood that I do not wish to be limited thereto, since various changes may be made therein without departing from the spirit of the invention.

What I claim is:

1. In a vulcanizing apparatus adapted for superposed moulds, the combination of a series of manifold couplings, a ram for placing endwise pressure on the series, a spring-pressed plunger adapted to engage an end coupling, a cylinder for said plunger, a spring mounted within said cylinder, a tubular member leading from said plunger to the exterior of the vulcanizer and adapted for connection with a source of fluid under pressure.

2. In a vulcanizing apparatus adapted for superposed moulds, the combination of a series of manifold couplings, a ram for placing endwise pressure on the series, a spring-pressed plunger adapted to engage an end coupling, a cylinder for said plunger, a spring mounted within said cylinder, a tubular member leading from said plunger to the exterior of the vulcanizer and adapted for connection with a source of fluid under pressure, and said cylinder and plunger being constructed to form a fluid passage to the rear of the plunger.

3. In a vulcanizing apparatus adapted for superposed moulds, the combination of a series of manifold couplings, a ram for placing endwise pressure on the series, a cover for said vulcanizer, a cylinder fixed to said cover, a plunger movable in said cylinder, a spring normally acting to move said plunger downwardly, a seat carried by said plunger for engagement with an end coupling, the plunger being formed with a passage leading to said seat, and a tubular member extending from said plunger outwardly through said cover and adapted for connection with a source of fluid under pressure.

4. In a vulcanizing apparatus adapted for superposed moulds, the combination of a series of manifold couplings, a ram for placing endwise pressure on the series, a cover for said vulcanizer, a cylinder fixed to said cover, a plunger movable in said cylinder, a spring normally acting to move said plunger downwardly, a seat carried by said plunger for engagement with an end coupling, the plunger being formed with a passage leading to said seat, and a tubular member extending from said plunger outwardly through said cover and adapted for connection with a source of fluid under pressure, and said plunger and cylinder being constructed to form a fluid passage leading to the rear of said plunger.

In witness whereof, I have hereunto signed my name.

JOHN WAHL.